No. 805,214. PATENTED NOV. 21, 1905.
C. B. LOWRY & R. BERNHARD.
WOOD IMPREGNATING APPARATUS.
APPLICATION FILED MAY 29, 1905.
6 SHEETS—SHEET 1.
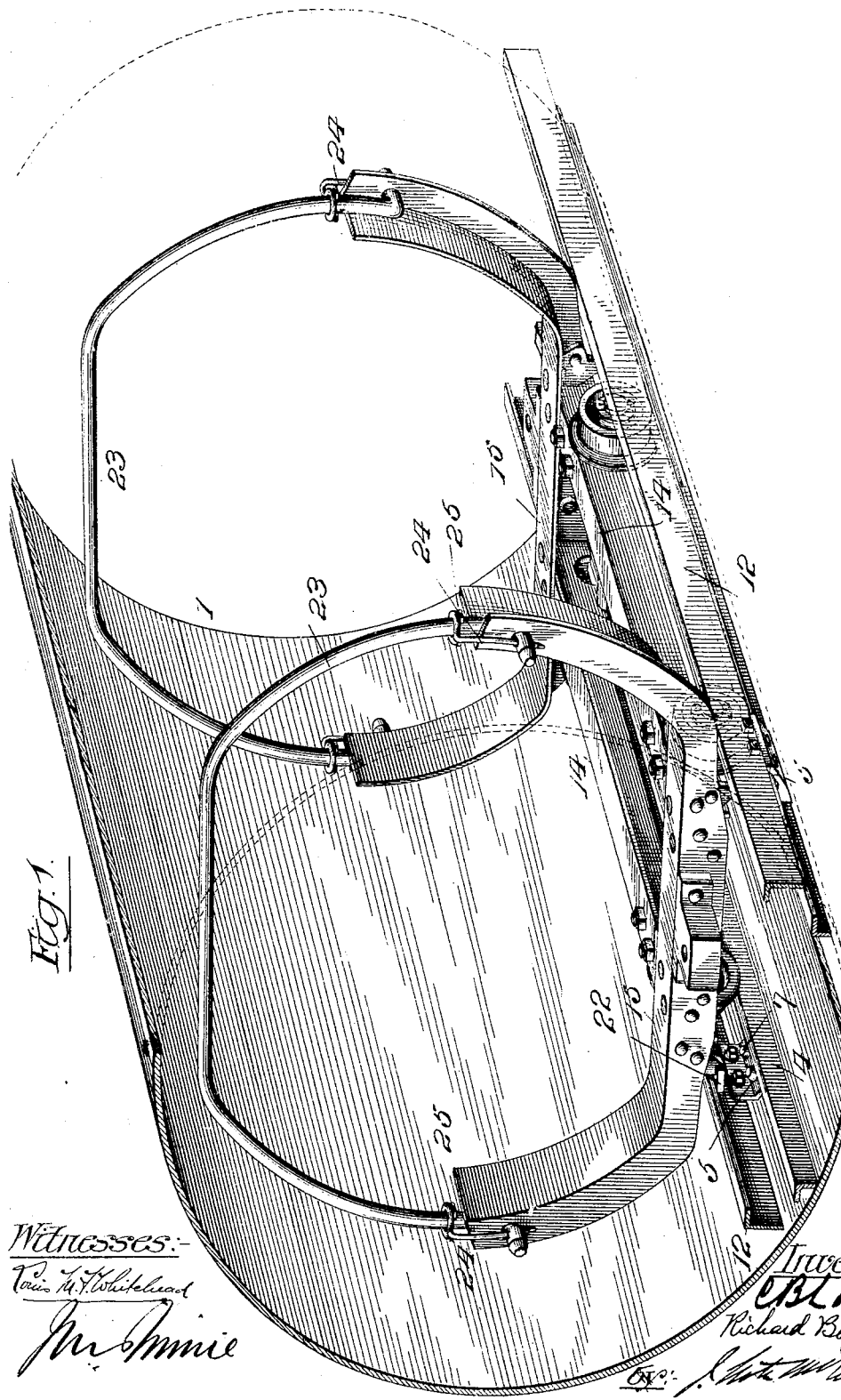

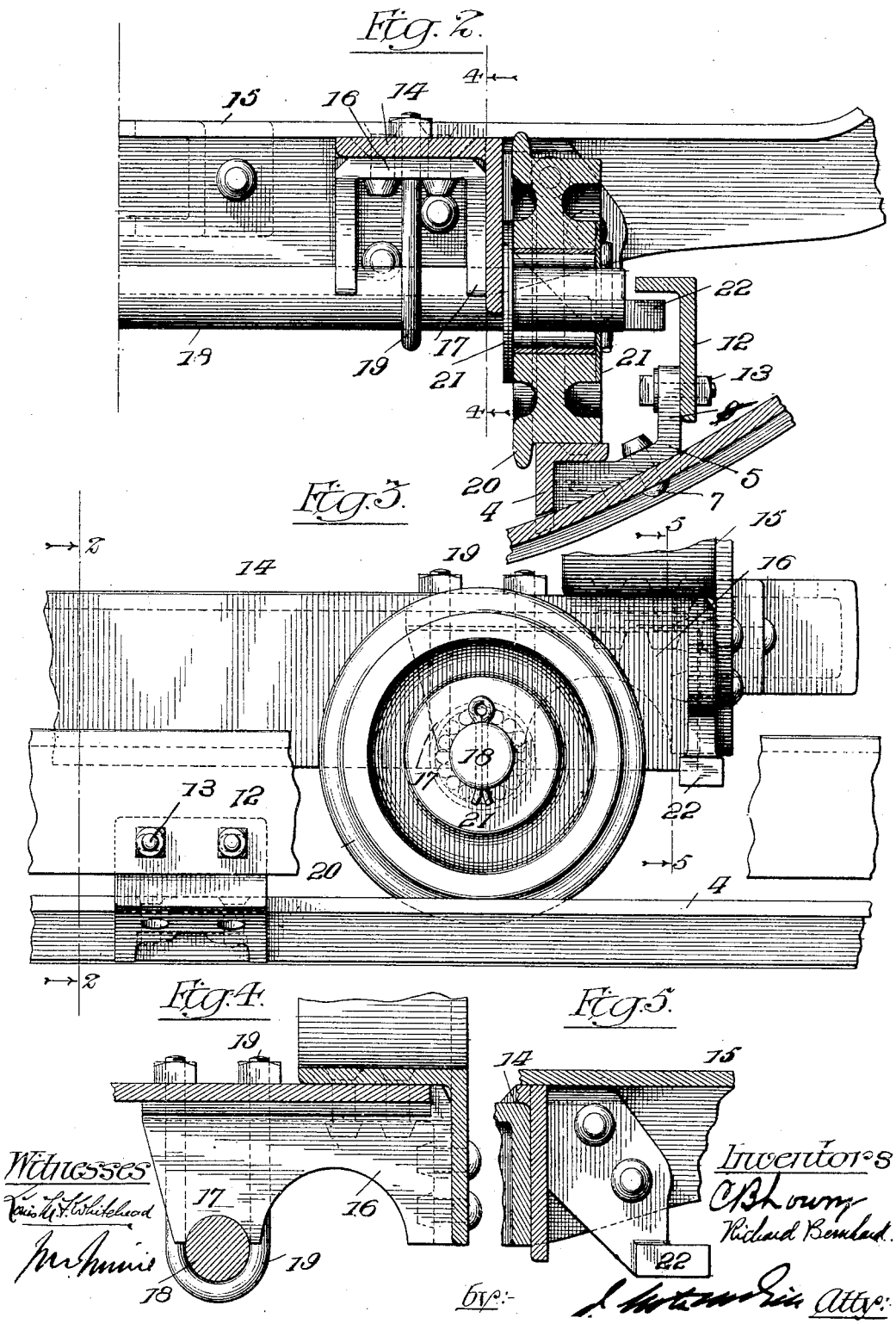

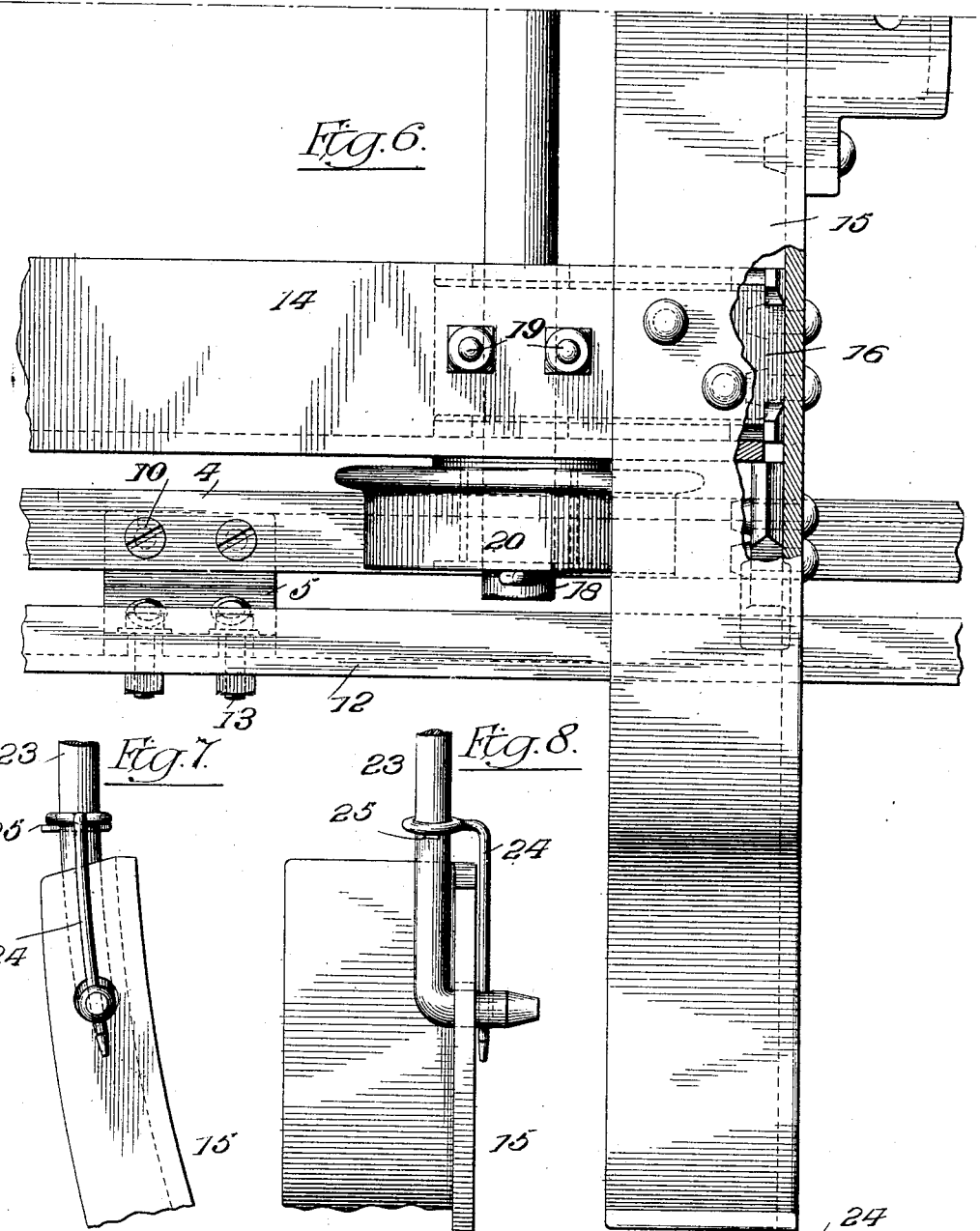

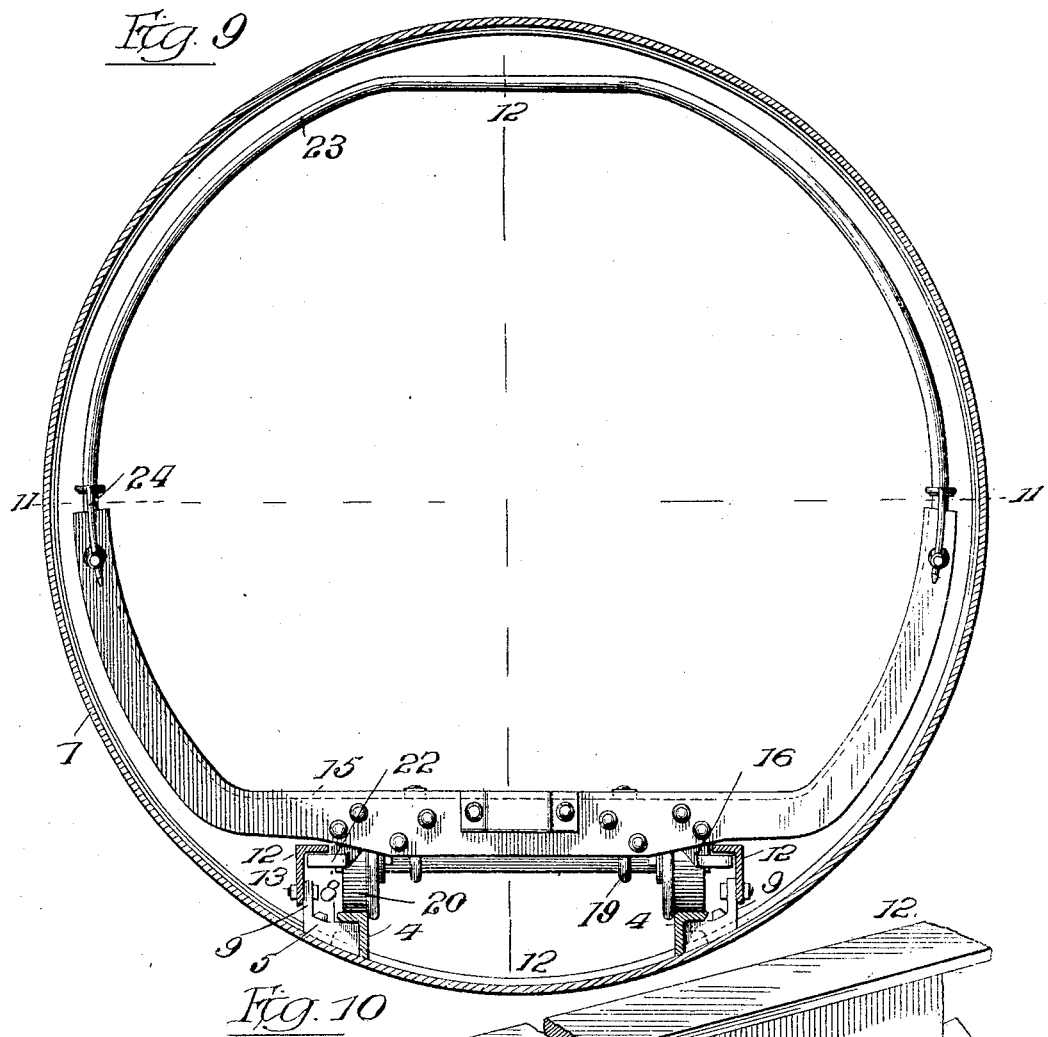

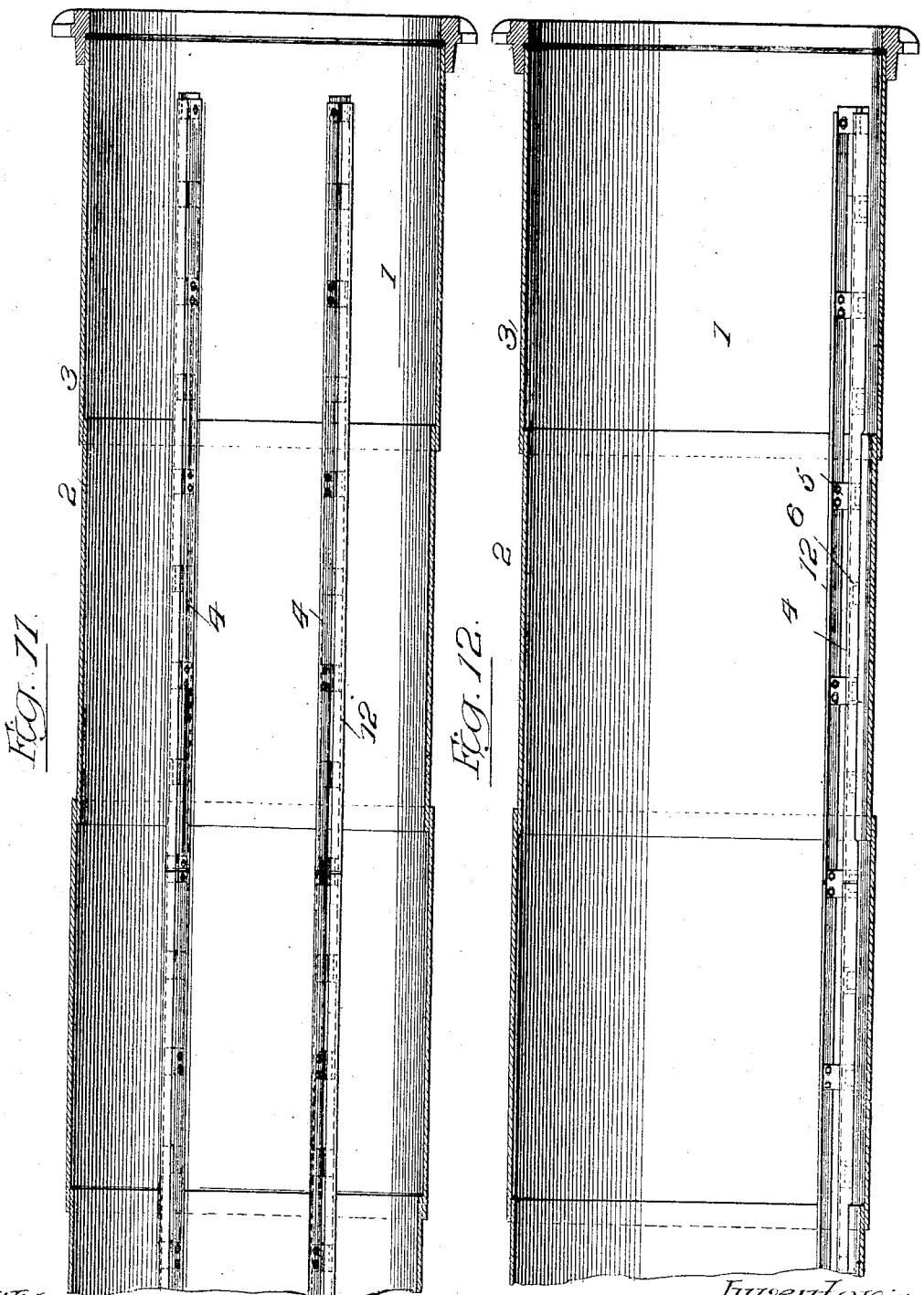

No. 805,214. PATENTED NOV. 21, 1905.
C. B. LOWRY & R. BERNHARD.
WOOD IMPREGNATING APPARATUS.
APPLICATION FILED MAY 29, 1905.
6 SHEETS—SHEET 6.
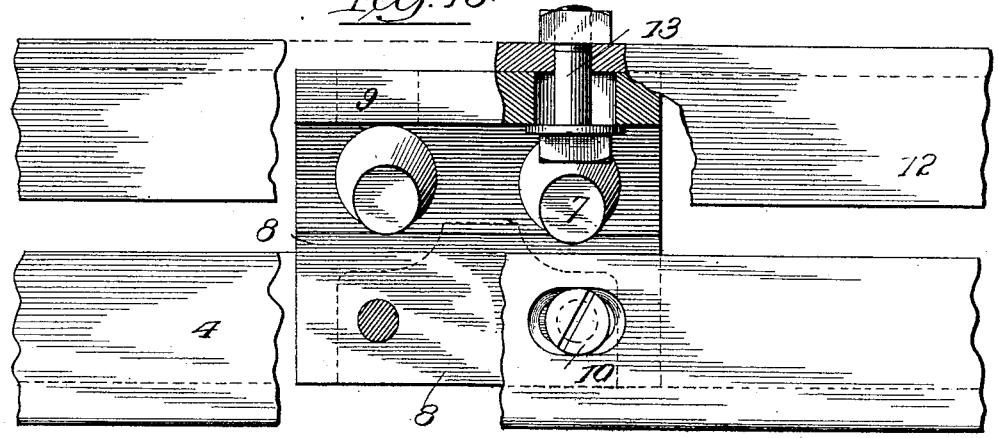
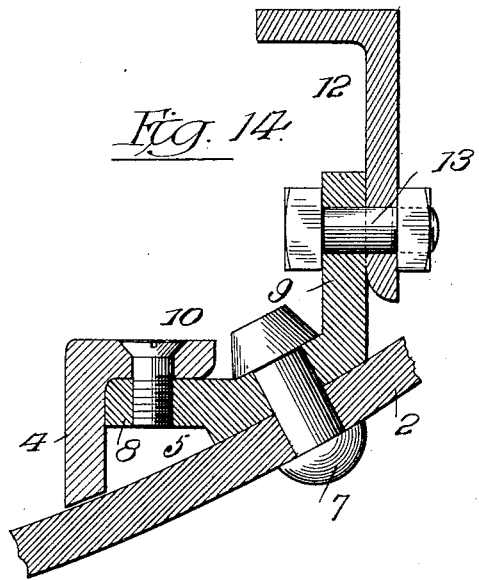
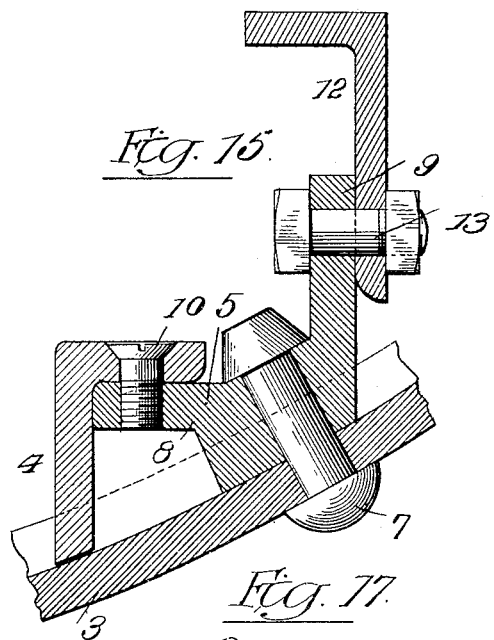
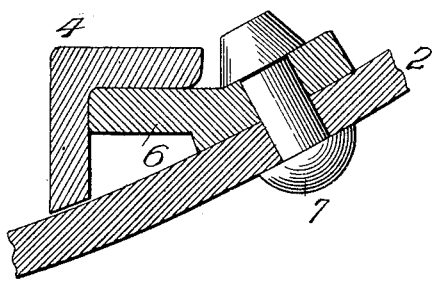
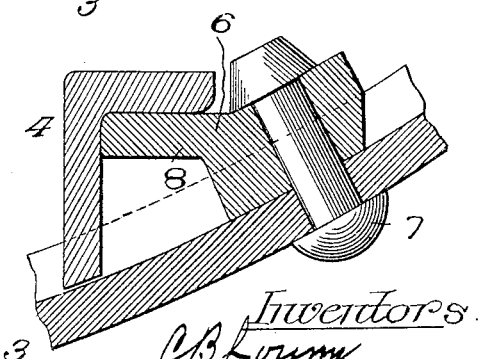

UNITED STATES PATENT OFFICE.

CUTHBERT B. LOWRY, OF LEXINGTON, KENTUCKY, AND RICHARD BERNHARD, OF CHICAGO, ILLINOIS.

WOOD-IMPREGNATING APPARATUS.

No. 805,214.          Specification of Letters Patent.          Patented Nov. 21, 1905.

Application filed May 29, 1905. Serial No. 262,920.

*To all whom it may concern:*

Be it known that we, CUTHBERT B. LOWRY, of Lexington, in the county of Fayette and State of Kentucky, and RICHARD BERNHARD, of Chicago, in the county of Cook and State of Illinois, have invented certain new and useful Improvements in Wood-Impregnating Apparatus; and we do hereby declare the following to be a full, clear, and exact description of the invention, such as will enable others skilled in the art to which it appertains to make and use the same.

The objects of this invention are to provide a wood-impregnating apparatus so constructed as to obtain maximum capacity in the cylinder charges, to strengthen the construction of the car, to provide improved means for limiting the amount of timber that can be placed on the car and to hold the same when submerged, and to simplify the construction of the track and guard rail fastenings.

The invention will be hereinafter fully set forth, and particularly pointed out in the claims.

In the accompanying drawings, Figure 1 is a view in perspective with parts in section, showing the car within the preserving-cylinder. Fig. 2 is a vertical sectional view on line 2 2, Fig. 3. Fig. 3 is a fragmentary view of the car and one of its wheels, a portion of the guard-rail being broken away. Fig. 4 is a section on line 4 4, Fig. 2. Fig. 5 is a section on line 5 5, Fig. 3. Fig. 6 is a plan view of a portion of the car and track-rails. Fig. 7 is a side elevation with a portion of the car frame and bail. Fig. 8 is a view of the same parts at right angles to Fig. 7. Fig. 9 is a transverse sectional view through the cylinder, showing the car in place. Fig. 10 is a perspective view of portions of the rails. Fig. 11 is a horizontal section of the cylinder on line 11 11, Fig. 9, with the car omitted. Fig. 12 is a vertical section of the cylinder on line 12 12, Fig. 9. Fig. 13 is a plan view of the chair for the guard and track rails, the rails being broken away. Fig. 14 is a sectional elevation of the combined track and guard rail chair for the inner courses of the cylinder-shell. Fig. 15 is a similar view of the same part for the outer courses of the shell. Figs. 16 and 17 are sectional elevations of the plain rail-chairs of the inner and outer courses, respectively.

Referring to the drawings, 1 designates the cylinder shell or casing, which, as shown in Figs. 11 and 12, is composed of inner and outer courses 2 and 3—that is to say, the ends of the sectional members of the shell overlap, each alternate section being on a plane within the next adjacent sections. The track-rails 4 are preferably made of angle-bars cut on the bottoms of their vertical legs to suit the shells of the cylinder. These track-rails are supported by chairs 5 6, which are attached to the shell at intervals by bolts or rivets 7, the number of chairs depending on the load the rails are intended to support. Each of the chairs 5 has a horizontal flange 8 and a vertical flange 9, the horizontal portions of the rails 4 resting on the horizontal flanges 8, to some of which they are secured by countersunk screws 10. (See Fig. 10.) It is not necessary that the rails be fastened to all the rail-chairs, (see Figs. 16 and 17,) since the flanges of the car-wheels aid in holding the rails on the chairs. Figs. 14 and 15 and 16 and 17 illustrate the differences in the chairs, those shown in Figs. 14 and 16 being for the inner courses of the shell and those in Figs. 15 and 17 for the outer courses. Although we prefer that the vertical portions of the rails be shaped to conform to the cylinder-shell, yet this is not necessary. It depends entirely upon the load the rails have to carry, and sufficient supporting strength can be obtained either by placing the chairs closer together or allowing the rails to bear on the shells.

12 designates a guard-rail in the form of an angle-bar, with its vertical legs attached to the vertical flanges 9 of the rail-chairs by nutted bolts 13, such bolts being passed through slotted openings to allow for changes in temperature and irregularities in workmanship. These guard-rails, like the track-rails, are made in convenient sections.

It will be observed that the track-rails are located close to the bottom of the shell, so as to increase the available capacity of the cylinder for receiving charges of material undergoing treatment. By this means the car will be much closer to the bottom of the shell than has heretofore been possible. This car has a frame composed of four principal members—two longitudinal side sills 14 and two transverse end sills 15—the latter being formed to suit the shape of the impregnating-cylinder and of varying depth, depending upon the stresses caused by the weight of the timber on the car. In other words, the end sills are curved at their ends upwardly and outwardly, so that they not only form the connections between the side sills, but also protect or retain the timber in position and serve as fixed guides in the piling thereof on the car. These side and end sills are preferably made of angle-bars, although we do not limit ourselves in this respect. They are connected together by means of rivets passed through castings 16, located at their points of union, which castings are also provided with flanges 17, forming bearings for the wheel-axles 18, the latter being held to the side sills preferably by means of U-bolts 19. The wheels 20 are bushed and fitted with roller-bearings, confined by means of washers or collars 21. (See Fig. 2.) To each of the end sills 15 is secured a laterally-extended lug 22, which travels in close proximity to the adjacent guard-rail 12, such lugs serving to prevent the car from lifting off the rails when within the impregnating-cylinder.

23 23 designate two bails preferably formed from rigid rods bent to conform to the upper portion of the cylinder-shell and removably secured to the ends of the end sills, so as to limit the loading of the timber and prevent the latter from contacting with the cylinder-shell. Each of these bails is formed with an angular end designed to extend through an opening in one of the flanges of its respective end sill, whereupon it is locked by pins 24, passed through openings in such angular ends, said pins being preferably coiled at their other ends so as to loosely secure them to the bail beyond the ends of the sills. To remove the bails, it is only necessary to slide the looped end of pins 24 upwardly on the bails, whereupon the angular ends of the latter may be withdrawn from the holes in the end openings. Pins 25 prevent the looped ends of pins 24 from sliding off the bails when the latter are removed.

The advantages of our invention are apparent to those skilled in the art. It will be readily seen by reference to Figs. 1 and 9 that by locating the track-rails close to the bottom of the cylinder we are enabled to utilize the full available capacity of the cylinder for receiving charges of material undergoing treatment, since the framing of the car is always close down to near the bottom of the cylinder. All danger of the car tilting is overcome by the hooks thereof projecting beneath the guard-rails. It will also be seen that we have provided extremely simple means for supporting the track-rails and guard-rails and securing them to the cylinder-shell and that by passing the bolts through slotted holes we can readily compensate for changes in temperature or irregularities in workmanship.

We claim as our invention—

1. A timber-car for wood-impregnating cylinders having longitudinal side sills and two end sills, fastened together at their points of intersection, said end sills being curved upwardly and outwardly to conform to the inclosing cylinder.

2. A timber-car for wood-impregnating cylinders having longitudinal side sills and two end sills, fastened together at their points of intersection, all of said sills being composed of angle-bars, and said end sills being curved upwardly and outwardly to conform to the inclosing cylinder.

3. A timber-car for wood-impregnating cylinders having longitudinal side sills and two end sills, castings at and held by the unions between said sills, said castings having flanges, and the holding-axles engaging said flanges.

4. A timber-car for wood-impregnating cylinders having upwardly-extended rigid bails thereon to limit the loading and prevent the timber from floating off the car while being impregnated.

5. In combination with a timber-car for wood-impregnating cylinders, upwardly-extended detachable rigid bails for limiting the loading and preventing the timber from floating off the car while being impregnated, and means for detachably securing such bails to the car.

6. A timber-car for wood-impregnating cylinders having end sills which at their ends are curved upwardly and outwardly, rigid bails extended transversely above the car, conforming to the upper portion of the cylinder, and means for detachably securing such bails to said sills.

7. A timber-car for wood-impregnating cylinders having end sills which at their ends are curved upwardly and outwardly, and formed with openings, rigid bails extended transversely above the car and having angular ends fitted in said openings, and locking-pins designed to be passed through openings in said angular ends.

8. The combination with the cylinder, the car, and the rigid bails secured thereto, of the angle-bar track-rails in close proximity to the longitudinal center of the bottom of said cylinder, and chairs for said rails secured to the cylinder.

9. The combination with the cylinder, the car, and the rigid bails secured thereto, of the angle-bar track-rails in close proximity to the longitudinal center of the bottom of said cylinder, and chairs for said rails secured to the cylinder, said rails being secured to some of said chairs and resting on the others.

10. The cylinder composed of inner and outer courses, and the car, in combination with rails for said car composed of angle-bars, and chairs of different height secured to said courses.

11. The combination with the cylinder and the car, of the track-rails, chairs therefor secured to said cylinder having horizontal and vertical flanges, the horizontal flanges being for the track-rails, guard-rails secured to said vertical flanges and having upper horizontal flanges, adjustable means securing said rails to said chairs, and lugs carried by the car extended beneath said horizontal flanges of the guard-rails.

In testimony whereof we have signed this specification in the presence of two subscribing witnesses.

CUTHBERT B. LOWRY.
RICHARD BERNHARD.

Witnesses:
LOWRY SMITH,
REUBEN W. MURPHY.